(12) United States Patent
Sayenko et al.

(10) Patent No.: US 12,355,708 B2
(45) Date of Patent: Jul. 8, 2025

(54) SYSTEMS AND METHODS FOR SUPPORTING IRREGULAR BANDWIDTH CHANNELS

(71) Applicant: Apple Inc., Cupertino, CA (US)

(72) Inventors: Alexander Sayenko, Munich (DE); Fucheng Wang, Cupertino, CA (US); Camila Priale Olivares, Munich (DE); Elmar Wagner, Taufkirchen (DE); Anatoliy S Ioffe, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 106 days.

(21) Appl. No.: 17/720,103

(22) Filed: Apr. 13, 2022

(65) Prior Publication Data

US 2023/0131663 A1    Apr. 27, 2023

Related U.S. Application Data

(60) Provisional application No. 63/270,332, filed on Oct. 21, 2021.

(51) Int. Cl.
*H04L 5/00* (2006.01)
(52) U.S. Cl.
CPC .......... *H04L 5/0096* (2013.01); *H04L 5/0044* (2013.01); *H04L 5/006* (2013.01); *H04L 5/0092* (2013.01)
(58) Field of Classification Search
CPC ....... H04B 1/005; H04B 1/401; H04L 5/0096; H04L 5/0044; H04L 5/006; H04L 5/0092; H04W 72/51; H04W 72/0453
See application file for complete search history.

(56) References Cited

U.S. PATENT DOCUMENTS 8,032,678 B2    10/2011    Tardieux
8,743,815 B2    6/2014    Choi
(Continued)

FOREIGN PATENT DOCUMENTS

CN    104871581 A    8/2015
CN    106416341 A    2/2017
(Continued)

OTHER PUBLICATIONS

3GPP TSG-RAN4 Meeting #98-e (Jan. 25-Feb. 5, 2021, R4-2101556), Utilizing larger bandwidth than the operator licensed bandwidth. (Year: 2021).*

(Continued)

*Primary Examiner* — Khoa Huynh
(74) *Attorney, Agent, or Firm* — FLETCHER YODER PC

(57) ABSTRACT

User equipment that is capable of filtering for an irregular bandwidth of an allocated channel may send an indication of this capability to a network, which may then configure the channel to a next higher standard channel size, enabling the user equipment to filter this larger channel bandwidth to the irregular bandwidth. User equipment that is not capable of filtering for the irregular bandwidth may send an indication that it does not have this capability to the network, which may then configure the channel to a next lower standard channel size, thus avoiding the need for the user equipment to filter a larger channel bandwidth to the irregular bandwidth. In cases where the network detects that a blocking signal is not present that may interfere with the allocated channel, the network may configure the channel to the next higher standard channel size.

22 Claims, 8 Drawing Sheets

(56) References Cited

U.S. PATENT DOCUMENTS

| | | |
|---|---|---|
| 11,296,842 B2 | 4/2022 | Wang |
| 2014/0126498 A1 | 5/2014 | Koorapaty et al. |
| 2018/0070267 A1 | 3/2018 | Ye |

FOREIGN PATENT DOCUMENTS

| | | | | |
|---|---|---|---|---|
| CN | 107205280 A | 9/2017 | | |
| CN | 109548087 A | 3/2019 | | |
| WO | WO-2019033290 A1 | * | 2/2019 | ............... H04L 1/04 |
| WO | WO-2020205652 A1 | * | 10/2020 | ........... H04L 1/1812 |

OTHER PUBLICATIONS

Bin Wu, Hongxi Yin, Anliang Liu, Chang Liu, Fangyuan Xing; Investigation and System Implementation of Flexible Bandwidth Switching for a Software-Defined Space Information Network; IEEE Photonics Journal, vol. 9, No. 3, Jun. 2017.

New SID: Study on Efficient utilization of licensed spectrum that is not aligned with existing NR channel bandwidths; T-Mobile USA, Ericsson; 3GPP TSG-RAN Meeting #89-e; Online, Sep. 14-19, 2020.

Ericsson: "Utilizing larger bandwidth than the operator licensed bandwidth"; 3GPP Draft, R4-2101556, 3rd Generation Parnership Project (3GPP) Mobile Competence Centre, France; vol. RAN WG4, No. Electronic Meeting; Jan. 25, 2021-Feb. 5, 2021 (XP052180060) [retrieved from internet: https://ftp.3gpp.org/tsg_ran/WG4_Radio/TSGR4_98-e/Docs/R4_2101556.zip R4-2101556.docx—retrieved on Jan. 15, 2021].

Ericsson: "Work Plan for Study on Efficient utilization of licensed spectrum that is not aligned with existing NR channel bandwidth", 3GPP Draft; R4-2016929, 3rd Generation Partnership Project (3GPP), Mobile Competence Centre, France; vol. RAN WG4, No. Online; Nov. 2, 2020-Nov. 13, 2020 (Nov. 16, 2020) (XP051954817) [retrieved from internet: https://ftp.3gpp.org/tsg_ran/WG4_Radio/TSGR4_97-3/Docs/R4-2016929.zip R4-2016929.docx—retrieved on Nov. 16, 2020].

Extended European Search Report for European U.S. Appl. No. 22/194,346 dated Feb. 8, 2023; 13 pgs.

3GPP, Ericsson, R4-2101556 Utilizing larger bandwidth than the operator licensed bandwidth, Feb. 5, 2021; 4 pgs.

3GPP, Ericsson, R4-2016929 Work Plan for Study on Efficient utilization of licensed spectrum that is not aligned with existing NR channel bandwidth, Nov. 13, 2020; 3 pgs.

* cited by examiner

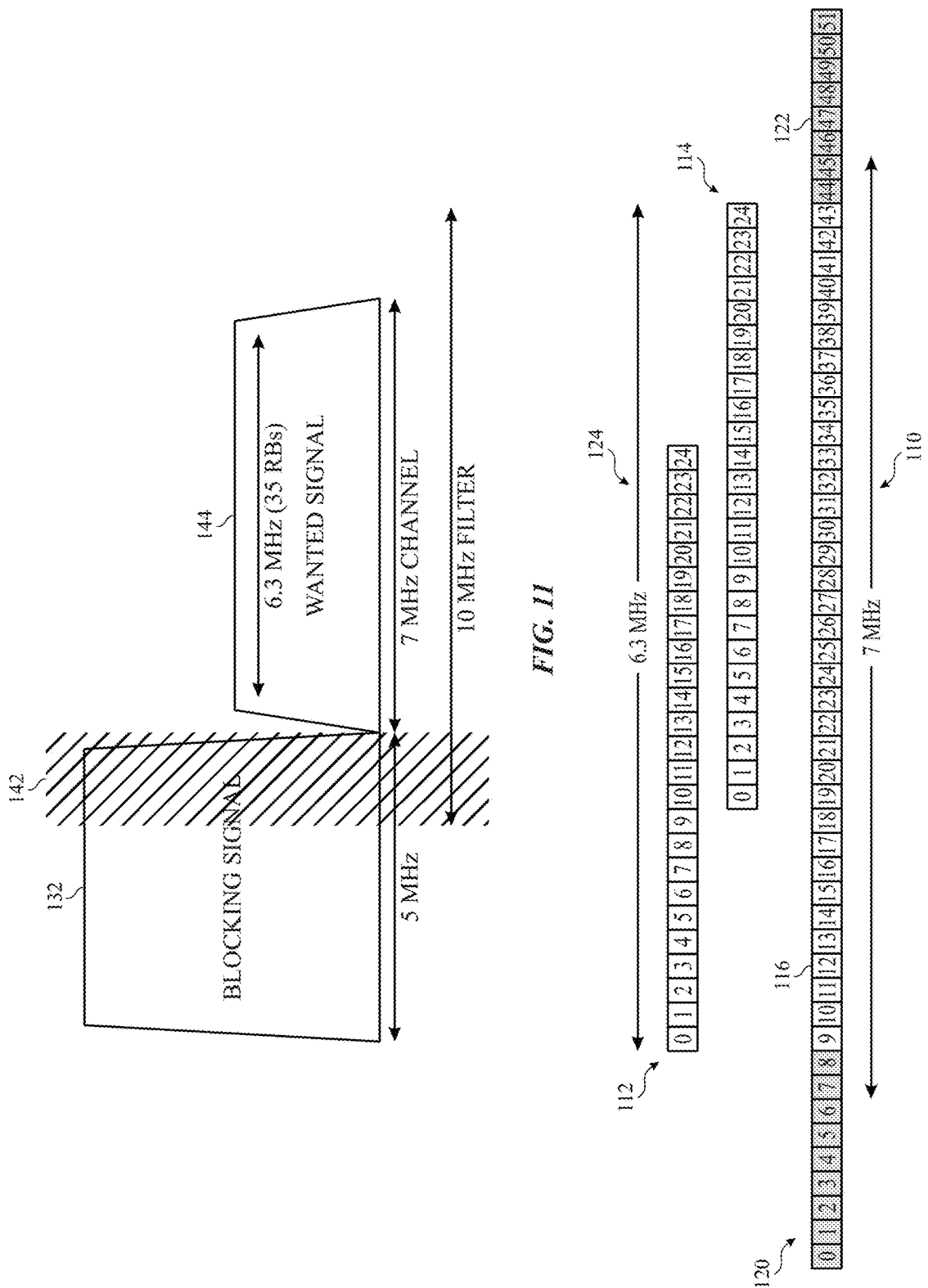

```
SIB1-> servingCellConfigCommon-> downlinkConfigCommon-> frequencyInfoDL-> scs-
SpecificCarrierList-> carrierBandwidth = 52 PRBs / subcarrierSpacing = 15 kHz
SIB1-> servingCellConfigCommon-> downlinkConfigCommon-> initialDownlinkBWP->
genericParameters-> locationAndBandwidth = 35 PRBs
```

FIG. 13

SYSTEMS AND METHODS FOR SUPPORTING IRREGULAR BANDWIDTH CHANNELS

CROSS-REFERENCE TO RELATED APPLICATIONS

This application claims priority to U.S. Provisional Application No. 63/270,332, filed Oct. 21, 2021, entitled "SYSTEMS AND METHODS FOR SUPPORTING IRREGULAR BANDWIDTH CHANNELS," the disclosure of which is incorporated by reference in its entirety for all purposes.

BACKGROUND

The present disclosure relates generally to wireless communication, and more specifically to communicating on channels with varying bandwidths.

The fifth generation (5G) New Radio (NR) radio access technology (RAT) developed by the Third Generation Partnership Project (3GPP) supports several standard channel bandwidths (e.g. 5 megahertz (MHz), 10 MHz, 15 MHz, etc.), as defined by the 3GPP Technical Specification (TS) 38.101-1. In most cases, regulators and network operators may allocate radio frequency (RF) spectrum (in the form of channels) in relatively large blocks that may be aligned with these standard channel bandwidths. However, in some cases, operators may allocate an RF spectrum having an irregular size that may not completely align with these standard channel bandwidths.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system includes a wireless communication network that receives a carrier bandwidth and an allocation bandwidth, configures user equipment for the carrier bandwidth based on the carrier bandwidth correlating to the allocation bandwidth, configures the user equipment for the carrier bandwidth greater than the allocation bandwidth based on a blocking signal not being present or the user equipment indicating a capability of filtering the allocation bandwidth, and configures the user equipment for the carrier bandwidth less than the allocation bandwidth based on the blocking signal being present and the user equipment not indicating the capability of filtering the allocation bandwidth. The system also includes the user equipment that indicates the capability of filtering the allocation bandwidth to the wireless communication network.

In another embodiment, a method performed by a wireless communication network includes configuring user equipment for a carrier bandwidth based on the carrier bandwidth correlating to the allocation bandwidth. The method also includes configuring the user equipment for the carrier bandwidth greater than the allocation bandwidth based on a blocking signal not being present or the user equipment indicating a capability of filtering the allocation bandwidth. The method further includes configuring the user equipment for the carrier bandwidth less than the allocation bandwidth based on the blocking signal being present and the user equipment not indicating the capability of filtering the allocation bandwidth.

In yet another embodiment, a method performed by user equipment includes receiving, at a receiver of the user equipment, a carrier bandwidth and an allocation bandwidth. The method also includes determining, using processing circuitry of the user equipment, that the carrier bandwidth is not equal to the allocation bandwidth, and determining, using the processing circuitry, whether one or more filters of the user equipment are capable of filtering the allocation bandwidth. The method further includes sending, using a transmitter of the user equipment, an indication of whether the one or more filters of the user equipment are capable of filtering the allocation bandwidth.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

FIG. 11 is a frequency diagram illustrating an allocated spectrum having a smaller irregular bandwidth, where the user equipment of FIG. 1 has configured its digital filter to a standard channel size larger than the smaller irregular bandwidth, and a blocking signal next to the allocated spectrum;

FIG. 12 is a frequency diagram of an allocated channel having an irregular bandwidth, which the network of FIG. 5 has configured to a lower channel having a next smaller standard channel size, an upper channel having a next smaller standard channel size, and a larger channel having a next higher standard channel size, according to embodiments of the present disclosure;

FIG. 13 is an example of signaling an irregular bandwidth by the network of FIG. 5 to the user equipment of FIG. 1, according to embodiments of the present disclosure.

DETAILED DESCRIPTION OF SPECIFIC EMBODIMENTS

Figure 1:
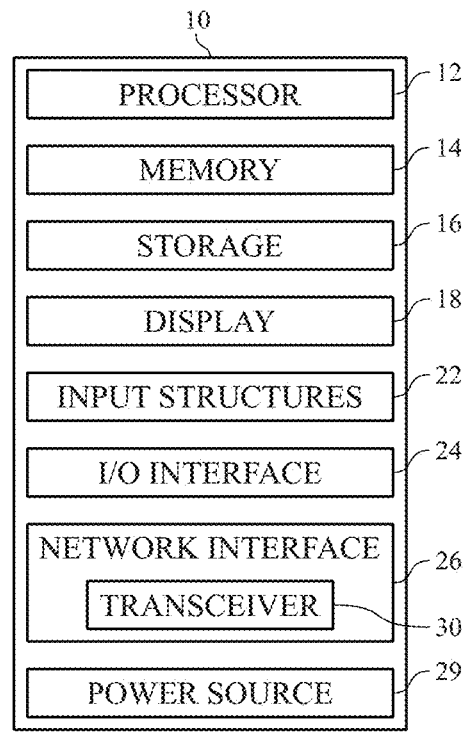
FIG. 1 is a block diagram of an electronic device, according to embodiments of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the terms "approximately," "near," "about," "close to," and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on). Moreover, it should be understood that any exact values, numbers, measurements, and so on, provided herein, are contemplated to include approximations (e.g., within a margin of suitable or contemplatable error) of the exact values, numbers, measurements, and so on.

This disclosure is directed to communicating on channels with irregular or non-standardized bandwidths. In particular, the fifth generation (5G) New Radio (NR) radio access technology (RAT) developed by the Third Generation Partnership Project (3GPP) supports several standard channel bandwidths (e.g. 5 megahertz (MHz), 10 MHz, 15 MHz, etc.), as defined by the 3GPP Technical Specification (TS) 38.101-1. In most cases, regulators and network operators may allocate radio frequency (RF) spectrum (in the form of channels) in relatively large blocks that may be aligned with these standard channel bandwidths. However, in some cases, operators may allocate an RF spectrum having an irregular size that may not completely align with these standard channel bandwidths. For example, this may happen when an existing non-International Mobile Telecommunications (IMT) spectrum is re-allocated or re-farmed to the IMT (e.g., a third generation (3G), fourth generation (4G), or 5G) spectrum, whereupon an old or outdated service used the non-IMT spectrum with a different channel size.

Embodiments herein provide various apparatuses and techniques to employ varying channel bandwidths, including these irregular or non-standardized channel bandwidths. In particular, user equipment that is capable of filtering for an irregular bandwidth of an allocated channel may send an indication of this capability to a network, which may then configure the channel to a next higher standard channel size, enabling the user equipment to filter this larger channel bandwidth to the irregular bandwidth. In some embodiments, the allocated channel may be a bandwidth part as defined by the 5G specification (e.g., a contiguous set of physical resource blocks selected from a contiguous subset of common resource blocks for a given numerology on a given carrier). User equipment that is not capable of filtering for the irregular bandwidth may send an indication that it does not have this capability to the network, which may then configure the channel to a next lower standard channel size, thus avoiding the need for the user equipment to filter a larger channel bandwidth to the irregular bandwidth. In cases where the network detects that a blocking signal is not present that may interfere with the allocated channel, the network may configure the channel to the next higher standard channel size.

FIG. 1 is a block diagram of an electronic device 10, according to embodiments of the present disclosure. The electronic device 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including machine-executable instructions) or a combination of both hardware and software elements (which may be referred to as logic). The processor 12, memory 14, the nonvolatile storage 16, the display 18, the input structures 22, the input/output (I/O) interface 24, the network interface 26, and/or the power source 29 may each be communicatively coupled directly or indirectly (e.g., through or via another component, a communication bus, a network) to one another to transmit and/or receive data between one another. It should be noted that FIG. 1 is merely one example of a particular implementation and is intended to illustrate the types of components that may be present in the electronic device 10.

By way of example, the electronic device 10 may include any suitable computing device, including a desktop or notebook computer (e.g., in the form of a MacBook®, MacBook® Pro, MacBook Air®, iMac®, Mac® mini, or Mac Pro® available from Apple Inc. of Cupertino, California), a portable electronic or handheld electronic device such as a wireless electronic device or smartphone (e.g., in the form of a model of an iPhone® available from Apple Inc. of Cupertino, California), a tablet (e.g., in the form of a model of an iPad® available from Apple Inc. of Cupertino, California), a wearable electronic device (e.g., in the form of an Apple Watch® by Apple Inc. of Cupertino, California), and other similar devices. It should be noted that the processor 12 and other related items in FIG. 1 may be embodied wholly or in part as software, hardware, or both. Furthermore, the processor 12 and other related items in FIG. 1 may be a single contained processing module or may be incorporated wholly or partially within any of the other elements within the electronic device 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may include one or more application processors, one or more baseband processors, or both, and perform the various functions described herein.

In the electronic device 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the electronic device 10 to provide various functionalities.

In certain embodiments, the display 18 may facilitate users to view images generated on the electronic device 10. In some embodiments, the display 18 may include a touch screen, which may facilitate user interaction with a user interface of the electronic device 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. In some embodiments, the I/O interface 24 may include an I/O port for a hardwired connection for charging and/or content manipulation using a standard connector and protocol, such as the Lightning connector provided by Apple Inc. of Cupertino, California, a universal serial bus (USB), or other similar connector and protocol.

The network interface 26 may include, for example, one or more interfaces for a personal area network (PAN), such as an ultra-wideband (UWB) or a BLUETOOTH® network, a local area network (LAN) or wireless local area network (WLAN), such as a network employing one of the IEEE 802.11x family of protocols (e.g., WI-FI®), and/or a wide area network (WAN), such as any standards related to the Third Generation Partnership Project (3GPP), including, for example, a $3^{rd}$ generation (3G) cellular network, universal mobile telecommunication system (UMTS), 4th generation (4G) cellular network, long term evolution (LTE®) cellular network, long term evolution license assisted access (LTE-LAA) cellular network, $5^{th}$ generation (5G) cellular network, and/or New Radio (NR) cellular network, a satellite network, a non-terrestrial network, and so on. In particular, the network interface 26 may include, for example, one or more interfaces for using a Release-15 cellular communication standard of the 5G specifications that include the millimeter wave (mmWave) frequency range (e.g., 24.25-300 gigahertz (GHz)) and/or any other cellular communication standard release (e.g., Release-16, Release-17, any future releases) that define and/or enable frequency ranges used for wireless communication. The network interface 26 of the electronic device 10 may allow communication over the aforementioned networks (e.g., 5G, Wi-Fi, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

Figure 2:
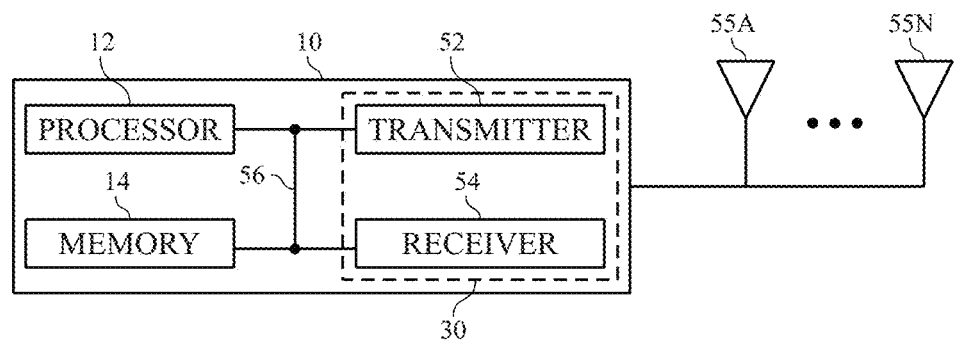
FIG. 2 is a functional diagram of the electronic device of FIG. 1, according to embodiments of the present disclosure.

FIG. 2 is a functional diagram of the electronic device 10 of FIG. 1, according to embodiments of the present disclosure. As illustrated, the processor 12, the memory 14, the transceiver 30, a transmitter 52, a receiver 54, and/or antennas 55 (illustrated as 55A-55N, collectively referred to as an antenna 55) may be communicatively coupled directly or indirectly (e.g., through or via another component, a communication bus, a network) to one another to transmit and/or receive data between one another.

The electronic device 10 may include the transmitter 52 and/or the receiver 54 that respectively enable transmission and reception of data between the electronic device 10 and an external device via, for example, a network (e.g., including base stations) or a direct connection. As illustrated, the transmitter 52 and the receiver 54 may be combined into the transceiver 30. The electronic device 10 may also have one or more antennas 55A-55N electrically coupled to the transceiver 30. The antennas 55A-55N may be configured in an omnidirectional or directional configuration, in a single-beam, dual-beam, or multi-beam arrangement, and so on. Each antenna 55 may be associated with a one or more beams and various configurations. In some embodiments, multiple antennas of the antennas 55A-55N of an antenna group or module may be communicatively coupled a respective transceiver 30 and each emit radio frequency signals that may constructively and/or destructively combine to form a beam. The electronic device 10 may include multiple transmitters, multiple receivers, multiple transceivers, and/or multiple antennas as suitable for various communication standards. In some embodiments, the transmitter 52 and the receiver 54 may transmit and receive information via other wired or wireline systems or means.

As illustrated, the various components of the electronic device 10 may be coupled together by a bus system 56. The bus system 56 may include a data bus, for example, as well as a power bus, a control signal bus, and a status signal bus, in addition to the data bus. The components of the electronic device 10 may be coupled together or accept or provide inputs to each other using some other mechanism.

Figure 3:
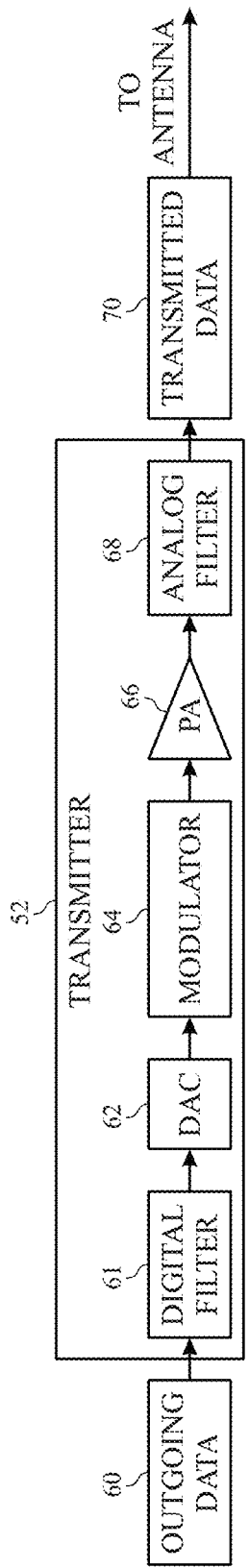
FIG. 3 is a schematic diagram of a transmitter of the electronic device of FIG. 1, according to embodiments of the present disclosure.

FIG. 3 is a schematic diagram of the transmitter 52 (e.g., transmit circuitry), according to embodiments of the present disclosure. As illustrated, the transmitter 52 may receive outgoing data 60 in the form of a digital signal to be transmitted via the one or more antennas 55. A digital filter 61 (e.g., filter circuitry and/or software) of the transmitter 52 may remove components from the digital signal that are outside of a desired frequency range. In some cases, the digital filter 61 may be tuned to (e.g., filter components outside of) a certain frequency range or fixed step size, such as a radio frequency (RF) channel bandwidth (e.g., 5 MHz, 10 MHz, and so on). In other cases, the digital filter 61 may be tuned to any allocable bandwidth (e.g., 1 MHz or less, 5 MHz or less, 10 MHz or less, and so on). The digital filter 61 may include any suitable filter that performs digital signal processing, including, for example, a linear filter, a causal filter, a time-invariant filter, a stable filter, a finite impulse response (FIR) filter, and so on. A digital-to-analog converter (DAC) 62 of the transmitter 52 may convert the digital signal to an analog signal, and a modulator 64 may combine the converted analog signal with a carrier signal to generate a radio wave. A power amplifier (PA) 66 receives the modulated signal from the modulator 64. The power amplifier 66 may amplify the modulated signal to a suitable level to drive transmission of the signal via the one or more antennas 55. An analog filter 68 (e.g., filter circuitry and/or software) of the transmitter 52 may then remove undesirable noise from the amplified signal to generate transmitted data 70 to be transmitted via the one or more antennas 55. The analog filter 68 may include any suitable filter or filters to remove the undesirable noise from the amplified signal, such as a bandpass filter, a bandstop filter, a low pass filter, a high pass filter, and/or a decimation filter. Additionally, the transmitter 52 may include any suitable additional components not shown, or may not include certain of the illustrated components, such that the transmitter 52 may transmit the outgoing data 60 via the one or more antennas 55. For example, the transmitter 52 may include a mixer and/or a digital up converter. As another example, the transmitter 52 may not include the analog filter 68 if the power amplifier 66 outputs the amplified signal in or approximately in a desired frequency range (such that filtering of the amplified signal may be unnecessary).

Figure 4:
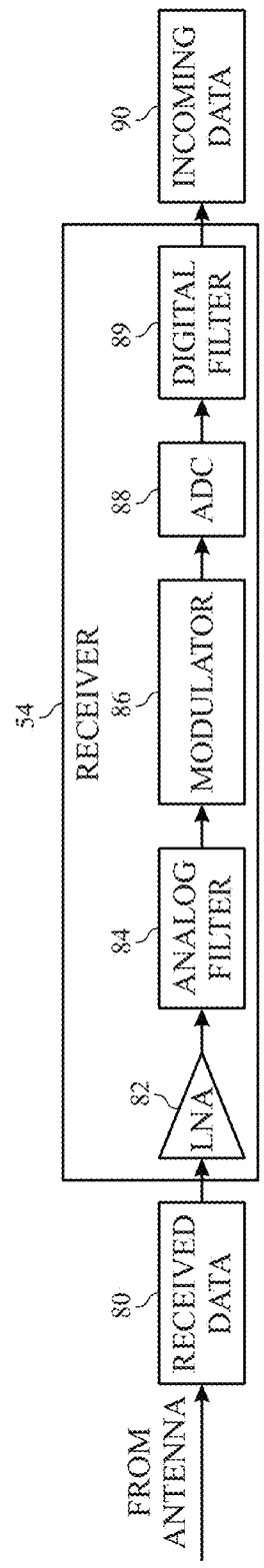
FIG. 4 is a schematic diagram of a receiver of the electronic device of FIG. 1, according to y embodiments of the present disclosure.

FIG. 4 is a schematic diagram of the receiver 54 (e.g., receive circuitry), according to embodiments of the present disclosure. As illustrated, the receiver 54 may receive received data 80 from the one or more antennas 55 in the form of an analog signal. A low noise amplifier (LNA) 82 may amplify the received analog signal to a suitable level for the receiver 54 to process. An analog filter 84 (e.g., filter circuitry and/or software) may remove undesired noise from the received signal, such as cross-channel interference. The analog filter 84 may also remove additional signals received by the one or more antennas 55 that are at frequencies other than the desired signal. The analog filter 84 may include any suitable filter or filters to remove the undesired noise or signals from the received signal, such as a bandpass filter, a bandstop filter, a low pass filter, a high pass filter, and/or a decimation filter. A demodulator 86 may remove a radio frequency envelope and/or extract a demodulated signal from the filtered signal for processing. An analog-to-digital converter (ADC) 88 may receive the demodulated analog signal and convert the signal to a digital signal. A digital filter 89 (e.g., filter circuitry and/or software) of the receiver 54 may remove components from the digital signal that are outside of a desired frequency range to generate incoming data 90 to be further processed by the electronic device 10. In some cases, the digital filter 89 may be tuned to (e.g., filter components outside of) a certain frequency range or fixed step size, such as an RF channel bandwidth (e.g., 5 MHz, 10 MHz, and so on). In other cases, the digital filter 89 may be tuned to any allocable bandwidth (e.g., 1 MHz or less, 5 MHz or less, 10 MHz or less, and so on). The digital filter 89 may include any suitable filter that performs digital signal processing, including, for example, a linear filter, a causal filter, a time-invariant filter, a stable filter, a finite impulse response (FIR) filter, and so on. Additionally, the receiver 54 may include any suitable additional components not shown, or may not include certain of the illustrated components, such that the receiver 54 may receive the received data 80 via the one or more antennas 55. For example, the receiver 54 may include a mixer and/or a digital down converter.

Figure 5:
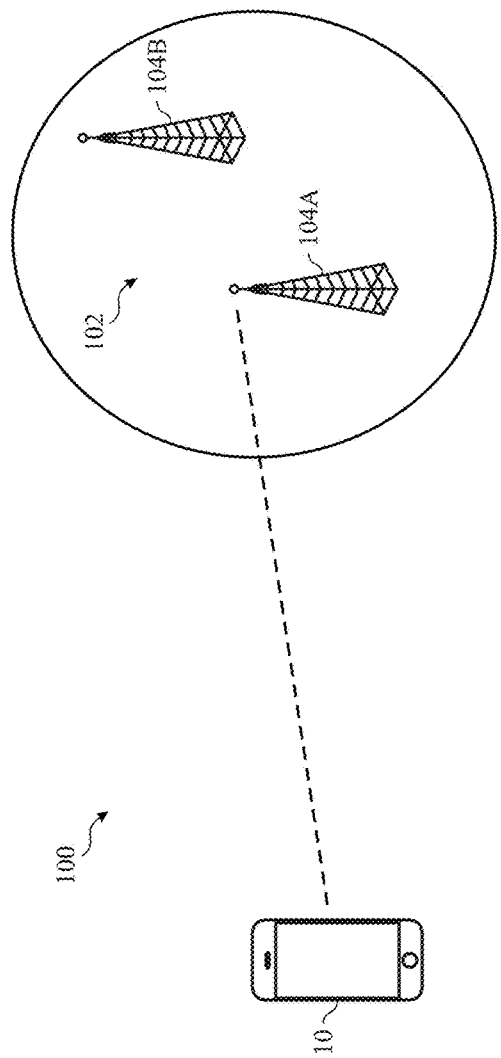
FIG. 5 is a schematic diagram of a communication system including the user equipment of FIG. 1 communicatively coupled to a wireless communication network supported by base stations, according to embodiments of the present disclosure.

FIG. 5 is a schematic diagram of a communication system 100 including the user equipment 10 of FIG. 1 communicatively coupled to a wireless communication network 102 supported by base stations 104A, 104B (collectively 104), according to embodiments of the present disclosure. In particular, the base stations 104 may include Next Generation NodeB (gNodeB or gNB) base stations and may provide 5G/New Radio (NR) coverage via the wireless communication network 102 to the user equipment 10. The base stations 104 may include any suitable electronic device, such as a communication hub or node, that facilitates, supports, and/or implements the network 102. In some embodiments, the base stations 104 may include Evolved NodeB (eNodeB) base stations and may provide 4G/LTE coverage via the wireless communication network 102 to the user equipment 10. Each of the user equipment 10 and the base stations 104 may include at least some of the components of the electronic device 10 shown in FIGS. 1 and 2, including one or more processors 12, the memory 14, the storage 16, the transceiver 30, the transmitter 52, the receiver 54, and the associated circuitry shown in FIG. 4. It should be understood that while the present disclosure may use 5G/NR as an example specification or standard, the embodiments disclosed herein may apply to other suitable specifications or standards (e.g., such as the 4G/LTE specification). Moreover, the network 102 may include any suitable number of base stations 104 (e.g., one or more base stations 104, four or more base stations 104, ten or more base stations 104, and so on).

As discussed previously, the 5G NR radio access technology (RAT) developed by the 3GPP supports several standard channel bandwidths (e.g. 5 MHz, 10 MHz, 15 MHz, etc.), as defined by the 3GPP Technical Specification (TS) 38.101-1. In most cases, regulators and network operators (e.g., the network 102, via a base station 104) may allocate radio frequency (RF) spectrum (in the form of channels) in relatively large blocks that may be aligned with these standard channel bandwidths. However, in some cases, the network 102 may allocate an RF spectrum having an irregular size that may not completely align with these standard channel bandwidths. For example, this may happen when an existing non-International Mobile Telecommunications (IMT) spectrum is re-allocated or re-farmed to the IMT (e.g., a third generation (3G), fourth generation (4G), or 5G) spectrum, whereupon an old or outdated service used the non-IMT spectrum with a different channel size.

Figure 6:
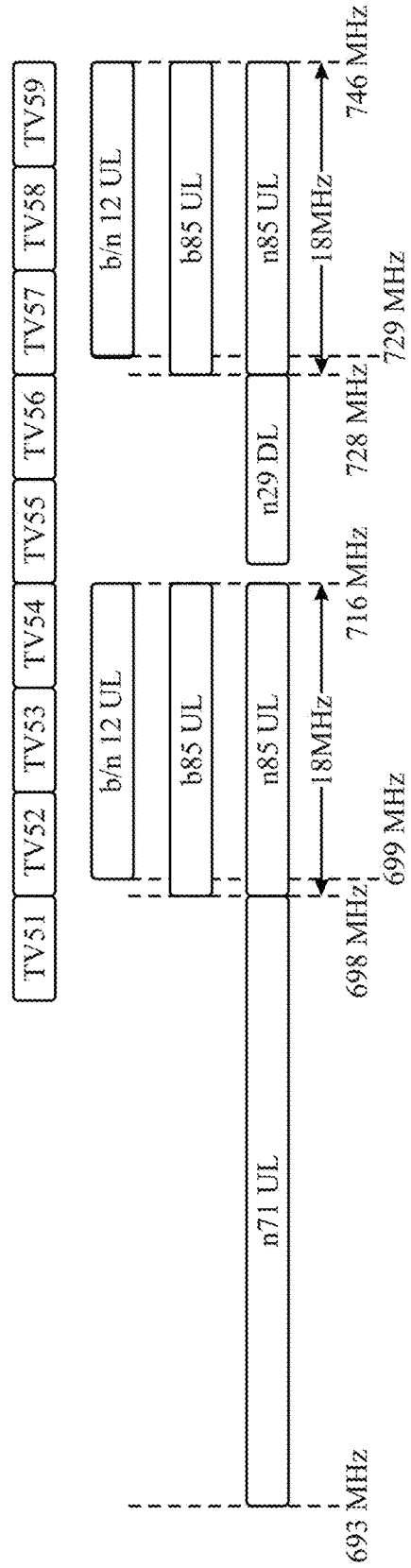
FIG. 6 is frequency diagram of non-IMT channels that have been re-allocated to the IMT spectrum.

FIG. 6 is frequency diagram of non-IMT channels that have been re-allocated to the IMT spectrum. In particular, as illustrated, non-IMT television (TV) frequency bands 52-54 (each having a bandwidth of 6 MHz) have been re-farmed to 3GPP uplink (UL) frequency bands 12 and 85, which have irregular or non-standard bandwidth sizes of 17 MHz and 18 MHz, respectively. Similarly, non-IMT TV frequency bands 57-59 (each having a bandwidth of 6 MHz) have been re-farmed to 3GPP downlink (DL) frequency bands 12 and 85, which have irregular or non-standard bandwidth sizes of 17 MHz and 18 MHz, respectively. Support for these irregular RF spectrums, which may include bandwidths of 6 MHz, 7 MHz, 11 MHz, 12 MHz, 13 MHz, and so on, may be increasingly requested by network operators. Typically, regular or standard channel bandwidths may be multiples of 5 MHz (e.g., 5 MHz, 10 MHz, 15 MHz, and so on), so the irregular channel bandwidths may include 1-4 MHz, 6-9 MHz, 11-14 MHz, 16-19 MHz, and so on.

Figure 7:
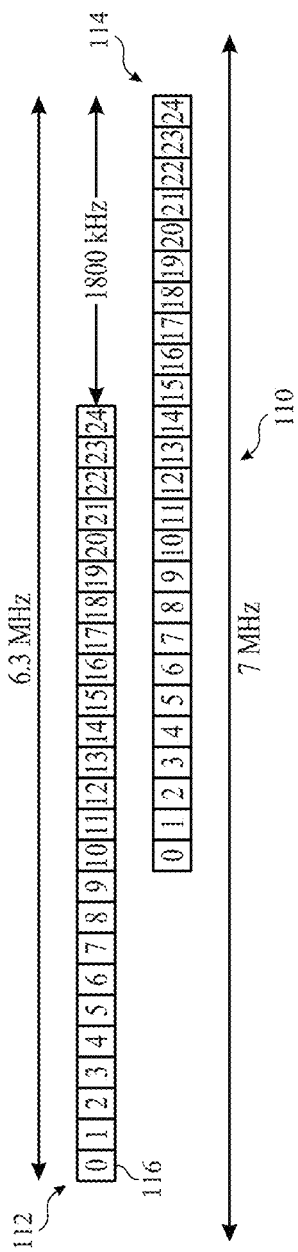
FIG. 7 is a frequency diagram of an allocated channel having an irregular bandwidth for which the network of FIG. 5 has configured into two overlapping channels having bandwidths of the next lower standard channel size, according to embodiments of the present disclosure.

In some embodiments, for an allocated spectrum having an irregular channel bandwidth, the network 102 may configure the channel or carrier bandwidth of the allocated spectrum to the next lower or smaller standard channel size. For example, if the channel bandwidth of the allocated spectrum is 7 MHz, then the network 102 may configure the channel bandwidth to 5 MHz (e.g., to an effective bandwidth). In some embodiments, the allocated channel may be a bandwidth part as defined by the 5G specification (e.g., a contiguous set of physical resource blocks selected from a contiguous subset of common resource blocks for a given numerology on a given carrier). In some cases, the network 102 may configure the allocated channel to two overlapping channels of the next lower standard channel size (e.g., a lower channel and an upper channel). This may be particularly apt for user equipment 10 that may not have a filtering capability (e.g., via the digital filter 61 for transmission or the digital filter 89 for reception) to filter the irregular channel bandwidth (e.g., of 7 MHz), such as older or legacy user equipment. FIG. 7 is a frequency diagram of an allocated channel 110 having an irregular bandwidth of 7 MHz, for which the network 102 has configured into two overlapping channels 112, 114 having bandwidths of the next lower standard channel size (5 MHz), according to embodiments of the present disclosure. Each of the lower configured channel 112 and the upper configured channel 114 is shown as having 25 resource blocks 116 (indexed 0-24), each having a bandwidth of 180 kilohertz (kHz), enabling a total bandwidth of 4.5 MHz. The lower channel 112 may share a lowest frequency with the allocated channel 110, while the upper channel 114 may share a highest frequency with the allocated channel 110, though it should be understood that any channel within the allocated channel 110 is contemplated having the next lower standard channel size.

Figure 8:
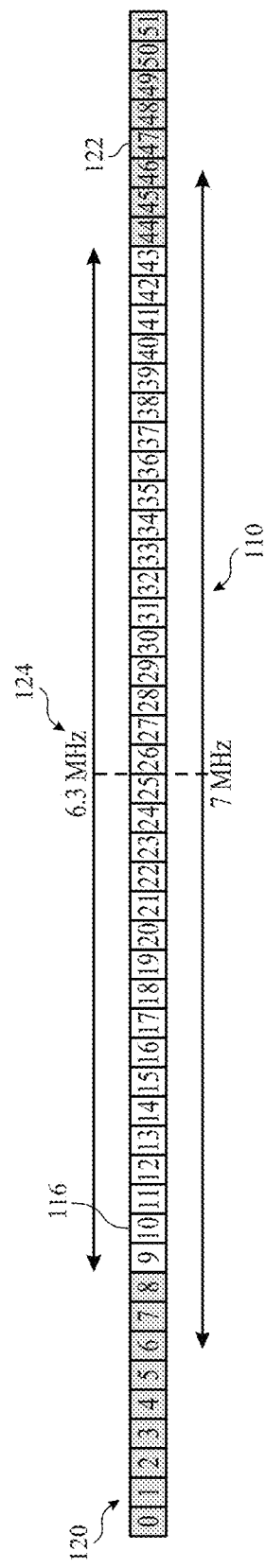
FIG. 8 is a frequency diagram of the allocated channel of FIG. 7 having the irregular bandwidth for which the network of FIG. 5 has configured into a channel having a bandwidth of the next higher standard channel size, according to embodiments of the present disclosure.

In additional or alternative embodiments, for an allocated spectrum having an irregular channel bandwidth, the network 102 may configure the channel or carrier bandwidth to the next higher or larger standard channel size. For example, if the channel bandwidth is 7 MHz, then the network 102 may configure the channel bandwidth to 10 MHz. FIG. 8 is a frequency diagram of the allocated channel 110 having an irregular bandwidth of 7 MHz, for which the network 102 has configured into a channel 120 having a bandwidth of the next higher standard channel size (10 MHz), according to embodiments of the present disclosure. The bandwidth of the channel 120 is shown as having 52 resource blocks (indexed 0-51), each having a bandwidth of 180 kilohertz (kHz), enabling a total effective bandwidth of 9.36 MHz. However, resource blocks 0-8 and 44-51 may be restricted 122 (shown as shaded), such that the effective bandwidth 124 equals that of the allocated bandwidth (e.g., of the irregular channel 110), shown as having 35 resource blocks (indexed 9-43), each having a bandwidth of 180 kilohertz (kHz), enabling a total effective bandwidth of 6.3 MHz.

As shown, using the next higher standard channel size with respect to the allocated bandwidth (as shown in FIG. 8) may advantageously enable the user equipment 10 to use all resource blocks 116 of the allocated channel, compared to using the next lower standard channel size with respect to the allocated bandwidth (as shown in FIG. 7). However, since the network 102 configured the user equipment 10 with the next higher standard channel size, the digital filter 61 (in case of transmission) or the digital filter 89 (in case of reception) of the user equipment 10 may be configured to filter for a larger bandwidth (e.g., the next higher standard channel size) instead of the effective bandwidth 124. This may create issues when there is another carrier signal (e.g., a blocking signal) next to the allocated spectrum of irregular bandwidth.

Figure 9:
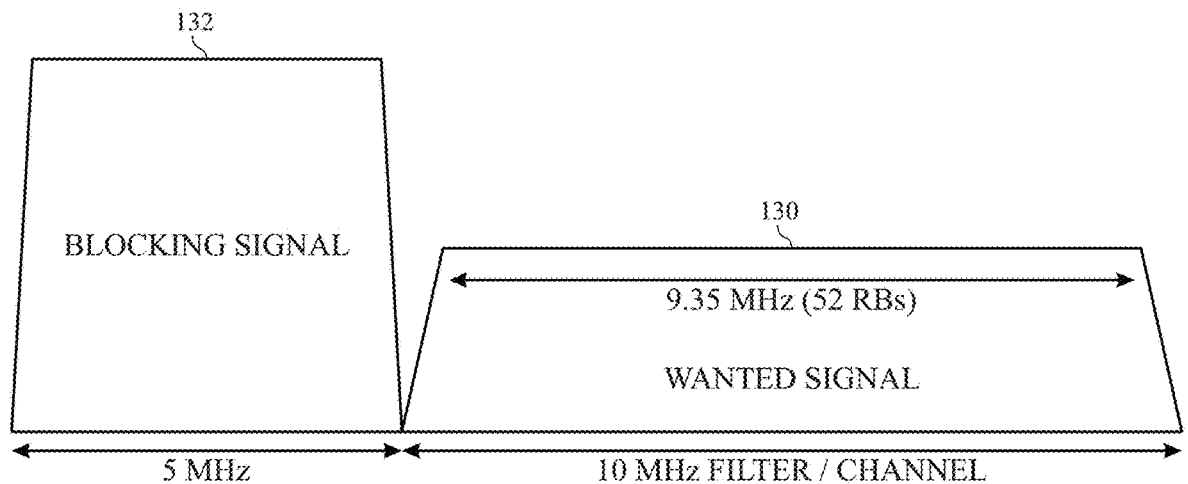
FIG. 9 is a frequency diagram illustrating an allocated spectrum having a bandwidth, where the user equipment of FIG. 1 has configured its digital filter to a standard channel size equal to the bandwidth, and a blocking signal next to the allocated spectrum.

For example, FIG. 9 is a frequency diagram illustrating an allocated spectrum 130 having a bandwidth of 10 MHz, where the user equipment 10 has configured its digital filter 61, 89 to the standard channel size or bandwidth of 10 MHz (e.g., thus matching the allocated bandwidth). In particular, the allocated spectrum 130 includes a desired or wanted signal having 52 resource blocks (RBs) each have a bandwidth of 180 kHz, thus totaling an effective bandwidth of 9.36 MHz. As such, when there is a blocking signal 132 (e.g., having a bandwidth of 5 MHz) next or adjacent to the allocated spectrum 130 (e.g., the blocking signal is present on a channel that shares a frequency or frequency border with the allocated spectrum 130), the blocking signal 132 may not interfere with the allocated spectrum 130.

Figure 10:
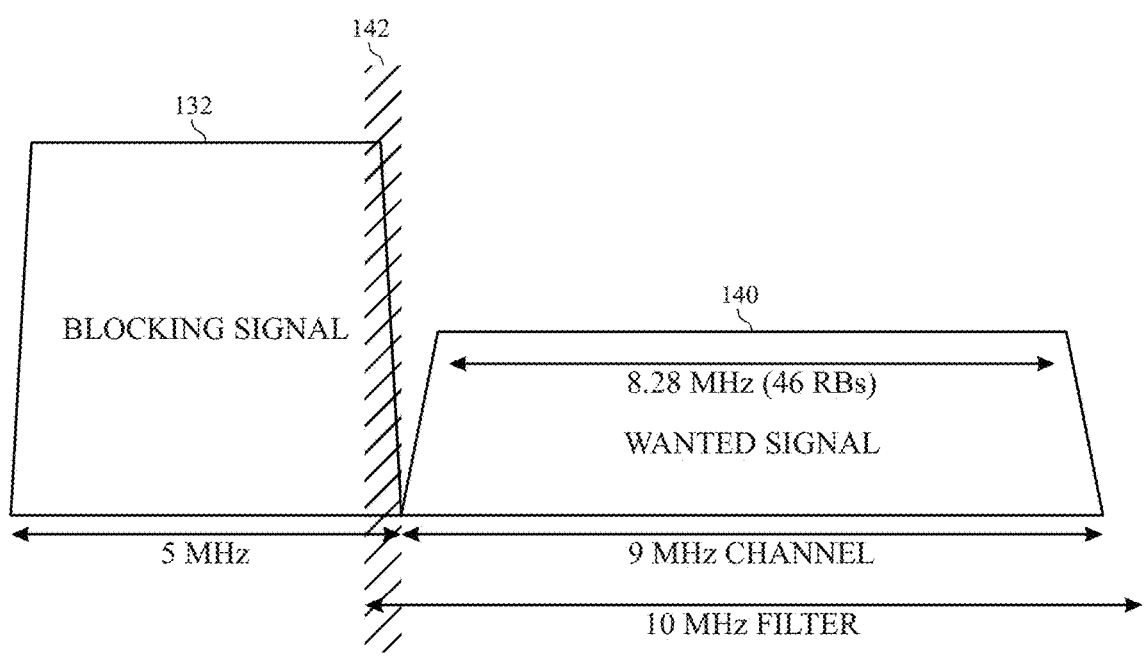
FIG. 10 is a frequency diagram illustrating an allocated spectrum having an irregular bandwidth, where the user equipment of FIG. 1 has configured its digital filter to a standard channel size larger than the irregular bandwidth, and a blocking signal next to the allocated spectrum.

However, when the bandwidth of the allocated spectrum 130 is less than the standard channel size of 10 MHz, but the user equipment 10 still has its digital filter 61, 89 configured to the standard channel size, then the blocking signal 132 may interfere with the allocated spectrum 130. For example, FIG. 10 is a frequency diagram illustrating an allocated spectrum 140 having a bandwidth of 9 MHz, where the user equipment 10 has configured its digital filter 61, 89 to the standard channel size or bandwidth of 10 MHz. In particular, the allocated spectrum 140 includes a desired or wanted signal having 46 RBs each have a bandwidth of 180 kHz, thus totaling an effective bandwidth of 8.28 MHz. As such, when there is a blocking signal 132 next or adjacent to the allocated spectrum 130, the blocking signal 132 may overlap with or fall into the digital filter's internal range 142 (e.g., a frequency range that the digital filter 61, 89 enables signal components to pass through). In particular, FIG. 10 shows that the blocking signal 132 falls into 0.5 MHz of the digital filter's internal range 142. As shown, the digital filter 61, 89 may not block out this portion of the blocking signal 132, which may cause at least some degradation to a signal received in the allocated spectrum 130. For example, signal quality and/or signal quality in the allocated spectrum 130 may be degraded. In some cases, noise caused by the blocking signal 132 in the frequency range 142 may combine or fold into a desired signal in the allocated spectrum 130, which may not be rejected by the analog filter 68, 84. FIG. 11, a frequency diagram illustrating an allocated spectrum 140 having a bandwidth of 6 MHz, where the user equipment 10 has configured its digital filter 61, 89 to the standard channel size or bandwidth of 10 MHz, illustrates an even more impacted scenario. In particular, the allocated spectrum 144 includes a desired or wanted signal having 35 RBs each have a bandwidth of 180 kHz, thus totaling an effective bandwidth of 6.3 MHz. As illustrated, the blocking signal 132 overlaps with or falls into an even greater portion (e.g., 1.5 MHz of) the digital filter's internal range 146, thus degrading the signal received in the allocated spectrum 130 even further.

In some cases, the digital filter 61, 89 of the user equipment 10 may be capable of filtering at sufficiently granular step sizes (e.g., 1 MHz, 2 MHz, and so on) to filter for the irregular bandwidth of the allocated channel. In such cases, the user equipment 10 may send an indication of this capability to the network 102, which may then configure a channel to the next higher standard channel size, enabling the user equipment 10 to filter this larger channel bandwidth to the allocated, irregular bandwidth. In other cases, the digital filter 61, 89 of the user equipment 10 may not be capable of filtering at sufficiently granular step sizes to filter for the irregular bandwidth of the allocated channel. As such, the user equipment 10 may send an indication that it does not have this capability to the network 102, which may then configure a channel to the next lower standard channel size, thus avoiding the need for the user equipment 10 to filter a larger channel bandwidth to the allocated, irregular bandwidth. Moreover, in cases where a blocking signal is not present that interferes with the allocated spectrum, the network 102 may configure the channel to the next higher standard channel size.

The network 102 may configure an irregular bandwidth of an allocated channel to multiple channels having bandwidths of next lower standard channel sizes and a next higher channel size. FIG. 12 is a frequency diagram of the allocated channel 110 having an irregular bandwidth (e.g., 7 MHz), which the network 102 has configured to a lower channel 112 having a next smaller standard channel size, an upper channel 114 having a next smaller standard channel size, and a larger channel 120 having a next higher standard channel size, according to embodiments of the present disclosure. In particular, the network 102 may align the resource blocks 116 of the lower channel 112, the upper channel 114, and the larger channel 120 to enable coexistence of multiple user equipment 10 using the allocated channel. For the user equipment 10 that use the larger channel 120, there may be a limitation on the number of schedulable resource blocks. That is, shaded resource blocks 122 that are outside of the irregular bandwidth of the allocated channel 110 may not be scheduled while unshaded resource blocks 116 within the irregular bandwidth may be scheduled.

As previously noted, baseline or legacy user equipment 10 may not have the capability to tune their digital filters 61, 89 to filter for the irregular bandwidth of the allocated channel, while more advanced or modern user equipment 10 may have this capability. The irregular bandwidth may be signaled in a bandwidth part size field of a system information block (SIB) from the network 102 to the user equipment 10. FIG. 13 is an example of signaling the irregular bandwidth by the network 102 to the user equipment 10, according to embodiments of the present disclosure. The SIB 150 may indicate a carrier bandwidth ("carrierBandwidth") 152 corresponding to a channel size and an actual allocated bandwidth ("locationAndBandwidth") 154. As illustrated, the carrier bandwidth 152 may be expressed in physical resource blocks (e.g., 52 PRBs), as may the allocated bandwidth 154 (e.g., 35 PRBs). Upon receipt of the SIB 150, the user equipment 10 may compare the carrier bandwidth 152 and the allocated bandwidth 154. If equal, then the user equipment 10 may determine that the allocated bandwidth 154 is of a standard channel size (e.g., 5 MHz, 10 MHz, 15 MHz, and so on) that its digital filter 61, 89 may be configured for filtering (whether it be a legacy or more advanced user equipment 10). If the carrier bandwidth 152 and the allocated bandwidth 154 are not equal, then the user equipment 10 may determine that the allocated bandwidth 154 is of an irregular or nonstandard channel size. To differentiate between, for example, a first case when the network 102 allocates a channel having a standard bandwidth (e.g., of 10 MHz) with a smaller allocated bandwidth or bandwidth part (e.g., of 7 MHz), and a second case when the network 102 allocates an irregular channel having a non-standard bandwidth (e.g., of 7 MHz) but the next larger standard channel (e.g., having a bandwidth of 10 MHz) is configured, the network 102 may explicitly provide indications of the first case and/or the second case using corresponding signaling. Alternatively, if there is no explicit signaling, the user equipment 10 can use operable frequency information (e.g., as received via the SIB 150) to determine whether an allocated frequency band may have irregular channels for which digital filters (e.g., 61, 89) may be optimized (e.g., to filter for a non-standard bandwidth). In such a case, the user equipment 10 may then indicate to the network 102 whether it is capable of filtering the allocated bandwidth 154. In the case of a more advanced user equipment 10, its digital filters 61, 89 may filter the allocated bandwidth 154 (the actual bandwidth part) with appropriate increments (e.g., 1 MHz, 2 MHz, and so on).

The user equipment 10 may send its capability of filtering the allocated bandwidth 154 in any suitable manner or technique, such as via a 1-bit capability field, a series of fields corresponding to discrete channel bandwidths (e.g., including irregular channel bandwidths) to which the digital filter(s) 61, 89 may be tuned, an indicator that the user equipment 10 may tune its digital filter(s) 61, 89 to intermediate channel bandwidths (e.g., indicating that the one or digital filter(s) 61, 89 are capable of being tuned to a certain bandwidth step size, such as a step or increment size of 1 MHz, 2 MHz, etc.), and so on. It should be understood that this capability may be sent per user equipment 10 and/or per operable frequency band. One reason for enabling this capability per operable frequency band is because not all frequency bands have irregular channel bandwidths, and thus the user equipment's 10 digital filter (e.g., 61, 89) may be tested only for specific frequency bands. Moreover, any of these indications may be sent and/or used in conjunction. For example, the user equipment 10 may indicate via a 1-bit indicator that it is capable of filtering the allocated bandwidth 154 or configured bandwidth part bandwidth, and then the user equipment 10 may tune its digital filter(s) 61, 89 to the next larger bandwidth size with a step size of 1 MHz. In some embodiments, the corresponding information on which operable frequency bands have irregular channels and which irregular channels are available may be captured in the normative specifications.

Figure 14:
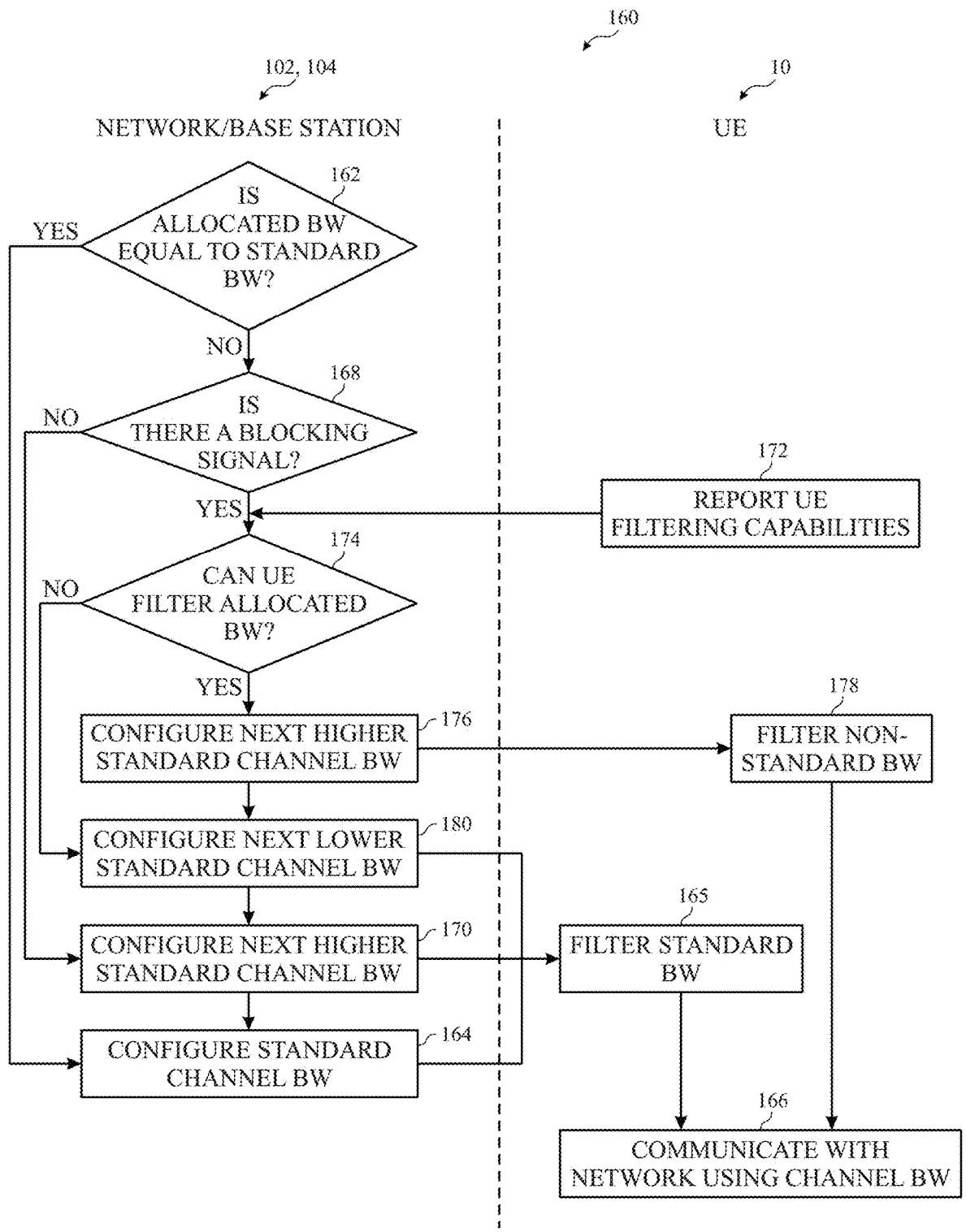
FIG. 14 is a flowchart of a method to utilize an allocated channel having an irregular bandwidth, according to embodiments of the present disclosure.

FIG. 14 is a flowchart of a method 160 to utilize an allocated channel having an irregular bandwidth, according to embodiments of the present disclosure. Any suitable device (e.g., a controller) that may control components of the user equipment 10, the network 102, and/or the base stations 104, such as the processor 12, may perform the method 160. In some embodiments, the method 160 may be implemented by executing instructions stored in a tangible, non-transitory, computer-readable medium, such as the memory 14 or storage 16, using the processor 12. For example, the method 160 may be performed at least in part by one or more software components, such as an operating system of the user equipment 10, the network 102, and/or the base stations 104, one or more software applications of the user equipment 10, the network 102, and/or the base stations 104, and the like. While the method 160 is described using steps in a specific sequence, it should be understood that the present disclosure contemplates that the described steps may be performed in different sequences than the sequence illustrated, and certain described steps may be skipped or not performed altogether.

The network 102 and/or the base station 104 may receive or determine a carrier bandwidth (e.g., of a standard channel size) and an allocation bandwidth. The network 102 may also send an indication of the carrier bandwidth and the allocated bandwidth to the user equipment 10. In particular, the network 102 may send the SIB 150 shown in FIG. 13 to the user equipment 10, which may indicate the carrier bandwidth 152 corresponding to a channel size and an actual allocated bandwidth 154. In this manner, the user equipment 10 may receive the indication (e.g., via the receiver 54 of the user equipment 10).

In decision block 162, the network 102 and/or the base station 104 determines whether the allocated bandwidth correlates to or is equal to a standard channel size (e.g., 5 MHz, 10 MHz, 15 MHz, and so on). If so, in process block 164, the network 102 and/or the base station 104 configures the user equipment 10 (e.g., for transmission, reception, or both) for communication using a channel of the standard channel bandwidth equal to the allocated bandwidth using, for example, a transmitter 52 of the base station 104. That is, because the allocated bandwidth is of the standard channel bandwidth, the user equipment 10 (e.g., including legacy user equipment 10 which may not have the capability to filter irregular bandwidths) may communicate using the allocated bandwidth without needing to filter for an irregular or non-standard channel bandwidth. Moreover, there is no concern regarding a blocking signal 132 interfering in an internal range of a digital filter 61, 89 of the user equipment 10. In process block 165, the user equipment 10 uses its digital filter(s) 61, 89 to filter for the standard channel bandwidth, and, in process block 166, the user equipment 10 communicates with the network 102 via the base station 104 using the channel configured by the network 102 having the standard channel bandwidth.

Returning back to decision block 162, if the network 102 and/or the base station 104 determines that the allocated bandwidth is not equal to (e.g., is less than) the standard bandwidth, then, in decision block 168, the network 102 and/or the base station 104 determines whether there is a blocking signal 132 next to or adjacent to the allocated spectrum/bandwidth, as shown in FIGS. 10 and 11. If not, then a blocking signal 132 may not interfere with the allocated channel, and, in process block 170, the network 102 and/or the base station 104 configures the user equipment 10 to operate (e.g., for transmission, reception, or both) on a bandwidth (e.g., a next higher standard channel bandwidth) greater than the allocated bandwidth using, for example, the transmitter 52 of the base station 104. Using the allocated channel 110 of FIG. 12 as an example, the network 102 and/or the base station 104 may cause or schedule the user equipment 10 to operate on the larger channel 120 having a next higher standard channel bandwidth (e.g., 10 MHz) than that of the allocated channel 110 (e.g., 7 MHz). The network 102 and/or the base station 104 may enforce a limitation on the number of schedulable resource blocks. That is, the network 102 and/or the base station 104 may prevent the shaded resource blocks 122 that are outside of the irregular bandwidth of the allocated channel 110 to be used or scheduled by the user equipment 10, while allowing the unshaded resource blocks 116 within the irregular bandwidth to be used or scheduled by the user equipment 10.

At process block 172, the user equipment 10 reports its filtering capability (e.g., via the transmitter 52 of the user equipment 10) to the network 102 via the base station 104. That is, the user equipment 10 may receive the allocated bandwidth or bandwidth part from the base station 104 (e.g., as part of the SIB 150 sent by the base station 104 and shown in FIG. 13). The user equipment 10 may then determine whether it can filter the allocated bandwidth, and report this determination to the network 102. For example, in the case of the allocated, irregular bandwidth being 7 MHz, the user equipment 10 determines whether it can filter a 7 MHz bandwidth, and reports this determination to the network 102 via the base station 104. If not, the user equipment 10 may send an indication to the base station 104 that it cannot filter for the allocated bandwidth. Such may be the case if the user equipment 10 is an older or legacy user equipment 10. In additional or alternative embodiments, the user equipment 10 may send an indication of the frequencies or ranges of frequencies for which it can filter, the types of filters (e.g., 61, 89) it may utilize, and so on, to the base station 104. In some embodiments, the user equipment 10 may only determine whether it can filter the allocated bandwidth and/or report its filtering capability in response to determining that the allocated bandwidth is different from a standard bandwidth (e.g., the carrier bandwidth 152 as shown in FIG. 13). Any of these indications, or any of the indications disclosed herein, may be in the form of setting bits of a field, signals, and so on, that are sent between the user equipment 10 and the base station 104.

In decision block 174, the network 102 and/or the base station 104 determines whether the user equipment 10 can filter the allocated bandwidth (e.g., based on the indication sent from the user equipment 10 in process block 172). If so, in process block 176, the network 102, via the base station 104, configures the user equipment 10 to operate on a next high standard channel bandwidth greater than the allocated bandwidth using, for example, the transmitter 52 of the base station 104, as described above with respect to process block 170. In particular embodiments associated with the configuration signaling in process block 176, the network 102, via the base station 104, may also explicitly indicate (e.g., through signaling to the user equipment 10) that a non-standard channel bandwidth is used for the user equipment 10 to optimize its filter configuration (e.g., to filter for the non-standard channel bandwidth). Using the allocated channel 110 of FIG. 12 as an example, the network 102 may cause or schedule the user equipment 10 to operate on the larger channel 120 having a next higher standard channel bandwidth than the allocated channel 110.

In process block 178a, the user equipment 10 may then use its digital filter(s) 61, 89 to filter for the non-standard, irregular, allocated bandwidth (e.g., 7 MHz, represented at least in part by the unshaded resource blocks 116 shown in FIG. 12), which may avoid interference by a blocking signal 132 in the internal range of the digital filter(s) 61, 89. Whether a user equipment 10 tunes its digital filter(s) 61, 89 to the non-standard bandwidth, as shown in process block 178, or to the standard bandwidth, as shown in process block 165, may depend on the configuration provided by the network 102. The configuration may be signaled either explicitly (in process block 176) or inferred implicitly by the user equipment 10 based on 3GPP band information when and/or where the communication channel is configured. In process block 166, the user equipment 10 then communicates with the network 102, via the base station 104, using the channel configured by the network 102 having the next higher standard channel bandwidth with respect to the allocated bandwidth.

If, in decision block 174, the network 102 and/or the base station 104 determines that the user equipment 10 cannot filter the allocated bandwidth, then, in process block 180, the network 102, via the base station 104, configures the user equipment 10 to operate (e.g., for transmission, reception, or both) on a next lower standard channel bandwidth less than the allocated bandwidth using, for example, the transmitter 52 of the base station 104. Using the allocated channel 110 of FIG. 12 as an example, the network 102, via the base station 104, may cause or schedule the user equipment 10 to operate on the lower or upper channel 112, 114 having a next smaller standard channel size (e.g., 5 MHz) than that of the allocated channel 110 (e.g., 7 MHz). As the lower or upper channel 112, 114 is each within the allocated channel 110, interference with a blocking signal 132 in an internal range of a digital filter 61, 89 of the user equipment 10 may be avoided. In process block 165, the user equipment 10 uses its digital filter(s) 61, 89 to filter for the next smaller standard channel size, and, in process block 166, the user equipment 10 then communicates with the network 102 and/or the base station 104 using the channel configured by the network 102 having the next lower standard channel bandwidth with respect to the allocated bandwidth. As shown, in the cases of process blocks 164 (e.g., where the allocated bandwidth is equal to a standard channel bandwidth), 170 (e.g., where there is no blocking signal 132 present), and 180 (e.g., where the user equipment 10 may not be able to filter for an irregular, non-standard bandwidth), the user equipment 10 may avoid having to filter for the irregular, non-standard bandwidth (as reflected in process block 178). In this manner, the method 160 may enable utilization of an allocated channel having an irregular bandwidth by the network 102 and the user equipment 10.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. An electronic device, comprising:
a transmitter configured to communicate with a user equipment;
a receiver configured to communicate with the user equipment; and
processing circuitry communicatively coupled with the transmitter and the receiver, the processing circuitry configured to
receive, via the receiver of the electronic device, an indication of a capability of the user equipment to filter an allocated bandwidth;
instruct, via the transmitter, the user equipment to use a first standard bandwidth based on the allocated bandwidth correlating to the first standard bandwidth, and
instruct, via the transmitter, the user equipment to use a second standard bandwidth, greater than the allocated bandwidth, based on the indication of the user equipment having the capability to filter the allocated bandwidth and a blocking signal being present, wherein the blocking signal is disposed outside of the first standard bandwidth.

2. The electronic device of claim 1, wherein the processing circuitry is configured to instruct, via the transmitter, the user equipment to use the second standard bandwidth based on the blocking signal not being present and the indication indicating that the user equipment has the capability to filter the allocated bandwidth.

3. The electronic device of claim 1, wherein the blocking signal comprises a carrier signal disposed adjacent to an allocated channel having the allocated bandwidth.

4. The electronic device of claim 1, wherein the processing circuitry is configured to determine whether the blocking signal is present based on whether the allocated bandwidth correlates to the first standard bandwidth.

5. The electronic device of claim 1, wherein the processing circuitry is configured to determine if the blocking signal is present based on the indication of the user equipment having the capability to filter to the allocated bandwidth.

6. The electronic device of claim 1, wherein the processing circuitry is configured to instruct, via the transmitter, the user equipment to use a third standard bandwidth, less than the allocated bandwidth, based on the indication of the user equipment not having the capability to filter the allocated bandwidth.

7. The electronic device of claim 6, wherein an allocated channel is associated with the allocated bandwidth, a standard channel is associated with the third standard bandwidth, and the standard channel comprises a lowest frequency of the allocated channel.

8. The electronic device of claim 6, wherein an allocated channel is associated with the allocated bandwidth, a standard channel is associated with the third standard bandwidth, and the standard channel comprises a highest frequency of the allocated channel.

9. The electronic device of claim 1, wherein the second standard bandwidth comprises a first plurality of resource blocks disposed inside the allocated bandwidth and a second plurality of resource blocks disposed outside of the allocated bandwidth.

10. The electronic device of claim 9, wherein the processing circuitry is configured to schedule the first plurality of resource blocks for use by the user equipment and not schedule the second plurality of resource blocks.

11. One or more non-transitory, tangible, computer-readable media storing instructions that, when executed by processing circuitry of a communication hub, cause the processing circuitry to:
  receive an indication from user equipment of a capability of the user equipment to filter an allocated bandwidth;
  instruct the user equipment to use a first standard bandwidth based on the allocated bandwidth correlating to the first standard bandwidth; and
  instruct the user equipment to use a second standard bandwidth, greater than the allocated bandwidth, based on the user equipment transmitting the indication of whether the user equipment has the capability to filter the allocated bandwidth and a blocking signal being present, wherein the blocking signal is disposed outside of the allocated bandwidth.

12. The one or more non-transitory, tangible, computer-readable media of claim 11, wherein the instructions cause the processing circuitry to prevent resource blocks of the second standard bandwidth that are outside of the allocated bandwidth to be used by the user equipment.

13. The one or more non-transitory, tangible, computer-readable media of claim 11, wherein the first standard bandwidth comprises a standard channel size according to a Third Generation Partnership Project (3GPP) fifth generation (5G) specification.

14. The one or more non-transitory, tangible, computer-readable media of claim 11, wherein the allocated bandwidth comprises a non-standard channel size according to a Third Generation Partnership Project (3GPP) fifth generation (5G) standard.

15. The one or more non-transitory, tangible, computer-readable media of claim 11, wherein the instructions cause the processing circuitry to determine whether there is a blocking signal disposed adjacent to an allocated channel having the allocated bandwidth in response to determining that the allocated bandwidth does not correlate with the first standard bandwidth.

16. An electronic device, comprising:
  a transceiver configured to communicate with a user equipment; and
  processing circuitry communicatively coupled with the transceiver and configured to:
    send, to the user equipment via the transceiver, a first indication of an allocated channel having an irregular bandwidth;
    receive, from the user equipment via the transceiver, a second indication that the user equipment has a filtering capability associated with the irregular bandwidth; and
    send, to the user equipment via the transceiver, an instruction to use a standard bandwidth based at least on determining that a blocking signal is present and the second indication, wherein the blocking signal is disposed outside of the standard bandwidth.

17. The electronic device of claim 16, wherein the processing circuitry is configured to determine whether the blocking signal is present based on the second indication, wherein the standard bandwidth is greater than the irregular bandwidth.

18. The electronic device of claim 16, wherein the processing circuitry is configured to determine that the user equipment does not have the filtering capability associated with the irregular bandwidth based at least on the second indication, wherein the standard bandwidth is less than the irregular bandwidth.

19. The electronic device of claim 16, wherein the first indication is a bandwidth part size field of a system information block.

20. The electronic device of claim 16, wherein the second indication indicates that the filtering capability of the user equipment is associated with a certain bandwidth step size.

21. The electronic device of claim 16, wherein the standard bandwidth is greater than the irregular bandwidth and includes a limitation on a number of schedulable resource blocks.

22. The electronic device of claim 16, wherein the second indication includes a series of fields corresponding to discrete channel bandwidths.

* * * * *